(12) United States Patent
Kaji

(10) Patent No.: US 11,458,774 B2
(45) Date of Patent: Oct. 4, 2022

(54) TIRE

(71) Applicant: BRIDGESTONE CORPORATION, Tokyo (JP)

(72) Inventor: Yoshio Kaji, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 179 days.

(21) Appl. No.: 16/622,074

(22) PCT Filed: May 16, 2018

(86) PCT No.: PCT/JP2018/018982
§ 371 (c)(1),
(2) Date: Dec. 12, 2019

(87) PCT Pub. No.: WO2018/235464
PCT Pub. Date: Dec. 27, 2018

(65) Prior Publication Data
US 2020/0180362 A1      Jun. 11, 2020

(30) Foreign Application Priority Data

Jun. 19, 2017 (JP) .............................. JP2017-120021
Jun. 19, 2017 (JP) .............................. JP2017-120022

(51) Int. Cl.
*B60C 11/12* (2006.01)
*B60C 11/03* (2006.01)
*B60C 11/11* (2006.01)

(52) U.S. Cl.
CPC ........ *B60C 11/1272* (2013.01); *B60C 11/032* (2013.01); *B60C 11/0323* (2013.01);
(Continued)

(58) Field of Classification Search
CPC ............. B60C 11/1281; B60C 11/1218; B60C 2011/1209
See application file for complete search history.

(56) References Cited

U.S. PATENT DOCUMENTS 9,022,083 B2    5/2015  Voss et al.
10,576,790 B2    3/2020  Lee et al.
(Continued)

FOREIGN PATENT DOCUMENTS

CN      102149548 A    8/2011
CN      103370212 A    10/2013
(Continued)

OTHER PUBLICATIONS

Taniguchi, English Machine Translation of DE 102015115832A1, 2015 (Year: 2015).*
(Continued)

*Primary Examiner* — Robert C Dye
*Assistant Examiner* — Brendon Charles Darby
(74) *Attorney, Agent, or Firm* — Kenja IP Law PC

(57) ABSTRACT

A sipe includes a first widened and a second widened portion. In a cross section orthogonal to the sipe extending direction, the sipe includes at least one bent portion, at least one bent portion has a widened portion where the width of sipe portions sandwiching the bent portion is increased, and at least one widened portion has a straight line portion, in which an angle formed with a line segment orthogonal to the normal line at the opening center of the sipe on the tread surface is 30° or more, in a wall surface on the major angle side of the bent portion of wall surfaces defining the widened portion.

4 Claims, 18 Drawing Sheets

(52) U.S. Cl.
CPC ...... *B60C 11/1218* (2013.01); *B60C 11/1281* (2013.01); *B60C 11/0306* (2013.01); *B60C 11/11* (2013.01); *B60C 2011/0341* (2013.01); *B60C 2011/1209* (2013.01)

(56) References Cited

U.S. PATENT DOCUMENTS

| | | |
|---|---|---|
| 2006/0088618 A1 | 4/2006 | Radulescu et al. |
| 2011/0168311 A1 | 7/2011 | Voss et al. |
| 2011/0220258 A1 | 9/2011 | Taniguchi et al. |
| 2012/0132337 A1 | 5/2012 | Toulemont et al. |
| 2014/0090761 A1 | 4/2014 | Foucher et al. |
| 2015/0013865 A1 * | 1/2015 | Yoshikawa ......... B60C 11/1218 152/209.18 |
| 2020/0231008 A1 | 7/2020 | Dayet et al. |

FOREIGN PATENT DOCUMENTS

| | | | |
|---|---|---|---|
| CN | 106414115 A | 2/2017 | |
| DE | 102015115832 A1 * | 3/2016 | ......... B60C 11/1218 |
| JP | 02310108 A | 12/1990 | |
| JP | H1086612 A | 4/1998 | |
| JP | 2006082651 A | 3/2006 | |
| JP | 2006298057 A | 11/2006 | |
| JP | 2012501914 A | 1/2012 | |
| JP | 2012510921 A | 5/2012 | |
| JP | 2013244812 A | 12/2013 | |
| KR | 101742279 B1 | 5/2017 | |
| NO | 2015185236 A1 | 12/2015 | |
| WO | 2010030276 A1 | 3/2010 | |
| WO | WO-2015185236 A1 * | 12/2015 | ........... B60C 11/032 |
| WO | 2018158546 A1 | 9/2018 | |

OTHER PUBLICATIONS

Seng et al., English Machine Translation of WO2015/185236A1, 2015 (Year: 2015).*

May 6, 2021, search result of Office Action issued by the China National Intellectual Property Administration in the corresponding Chinese Patent Application No. 201880040309X.

Jan. 27, 2021, search result of the Extended European Search Report issued by the European Patent Office in the corresponding European Patent Application No. 18819645.5.

Aug. 21, 2018, International Search Report issued in the International Patent Application No. PCT/JP2018/018982.

Dec. 24, 2019, International Preliminary Report on Patentability issued in the International Patent Application No. PCT/JP2018/018982.

* cited by examiner

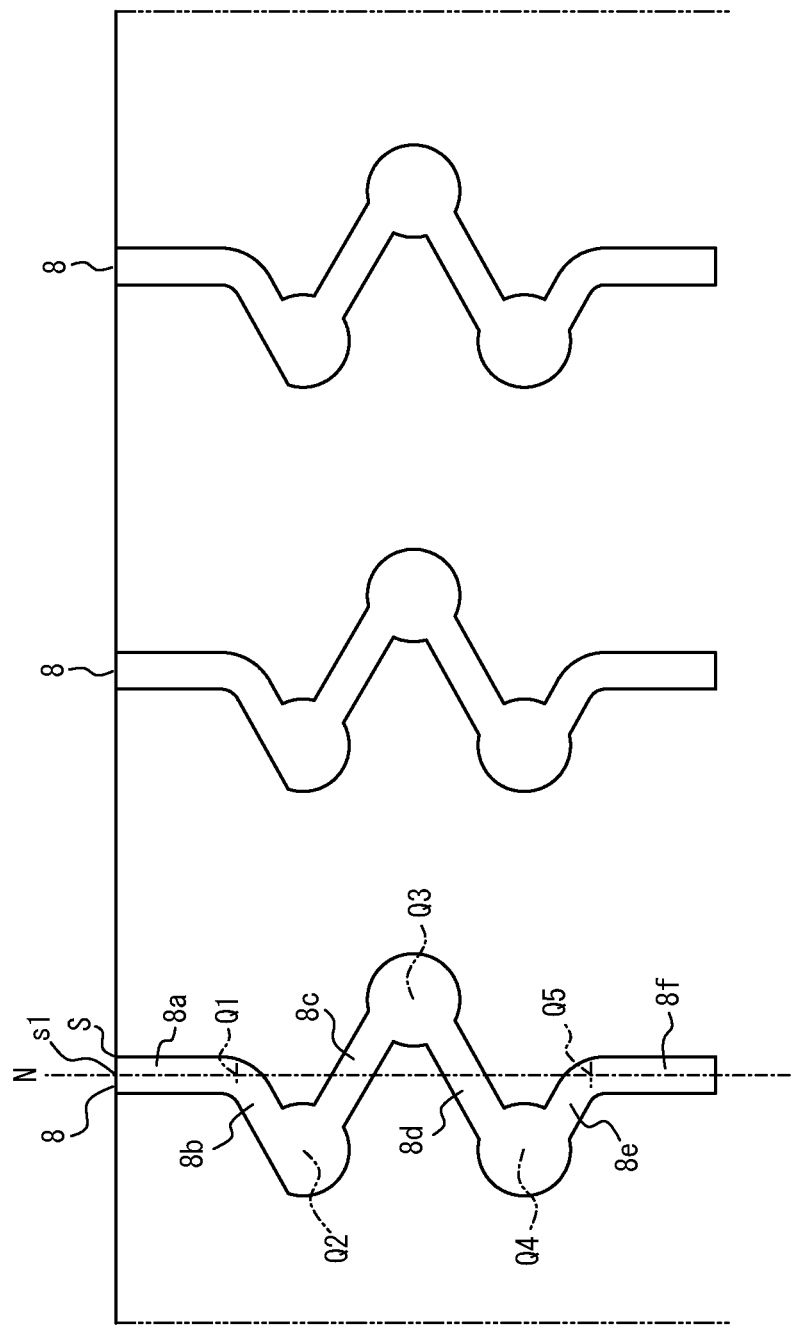

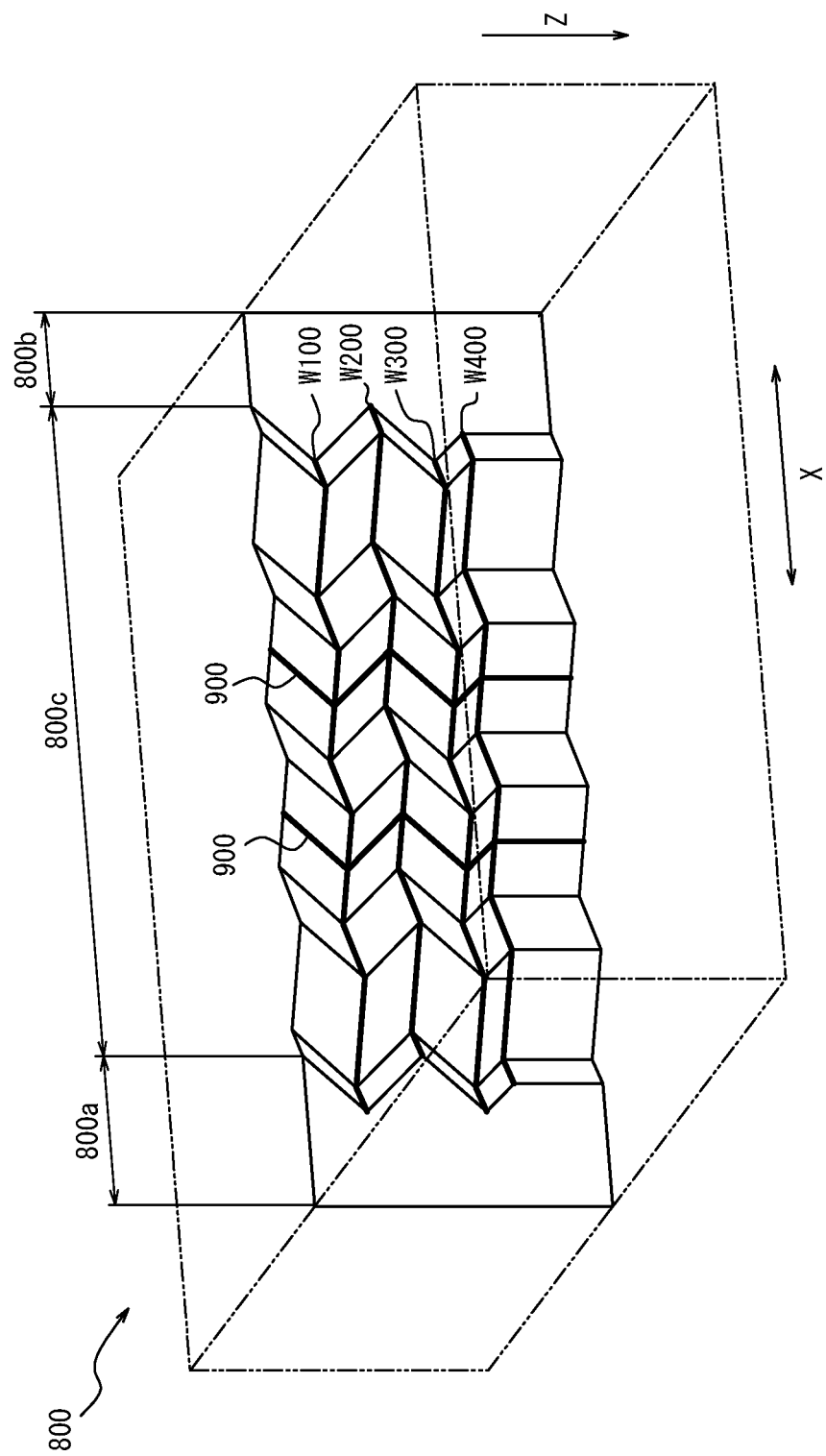

TIRE

TECHNICAL FIELD

This disclosure relates to a tire, and particularly to a tire having excellent drainage performance and steering stability.

BACKGROUND

A tire that is provided with a so-called sipe, which is a narrow groove formed by cutting, on a tread surface of the tire to improve the drainage performance when travelling on wet road surfaces including icy and snowy road surfaces has been known in recent years. When this tire travels on a wet road surface, water in a ground contact region of the tread is taken into the sipe and is drained out of the ground contact region. Repeating this process improves the drainage performance.

However, in the case of a normally used sipe with a uniform opening width, when the tire comes into contact with a road surface and receives a shearing force, the wall surfaces of the sipe portion close to the road surface may adhere to each other closely and the sipe may not take in a sufficient amount of water. In JP 2006-298057 A (PTL 1), the sipe includes a sipe portion formed by cutting a groove with a width of 2.0 mm or less and a widened portion that has a groove width of more than 2.0 mm and is continuous inward in the half width direction of the sipe portion, to improve the effect of taking in water on icy and snowy road surfaces.

The effect of the sipe increases as the number of sipes increases, yet an increased number of sipes in a land portion decreases the rigidity of the land portion. Therefore, when a load is applied to the tire during braking, driving or turning, collapsing deformation occurs in the land portion and the contact area between the tire and the road surface decreases, resulting in the problem of deterioration of grounding properties. With respect to this problem, JP 2013-244812 A (PTL 2) proposes that the sipe be bent in the sipe depth direction to suppress the collapsing deformation of the land portion and improve the grounding properties.

CITATION LIST

Patent Literature

PTL 1: JP 2006-298057 A
PTL 2: JP 2013-244812 A

SUMMARY

Technical Problem

For the sipe describe in PTL 1, the widened portion is located at a certain depth from the surface in contact with a road surface, so that the effect of taking in water may be insufficient once the wall surfaces of the sipe at a position closer to the road surface adhere to each other closely. In addition, higher drainage performance is particularly required in the case where there is a large amount of water on the road surface.

It could thus be helpful to provide a tire with high drainage performance.

Further, the technique described in PTL 2 bends the sipe to suppress the collapsing deformation of a land portion. However, since the sipe is bent in the depth direction, it is also desired to develop a technique that guarantees taking in a sufficient amount of water of a ground contact surface.

Thus, it could also be helpful to provide a tire with excellent drainage performance where the drainage performance of a sipe is improved without impairing the steering stability obtained by bending the sipe.

Solution to Problem

Having intensively studied solution to the problem, we have discovered that excellent drainage performance can be realized by devising the arrangement of widened portions in which the width of a sipe is partially increased, and completed the present disclosure.

In addition, we have found that excellent drainage performance and steering stability can be realized by devising the arrangement and the shape of widened portions in which the width of a sipe is partially increased, and completed the present disclosure.

The subject of the present disclosure is as follows.

The presently disclosed tire is a tire in which at least one land portion is defined on a tread surface of the tire between grooves or between a groove and a tread edge by at least one groove and a tread edge, where the at least one land portion includes at least one sipe extending linearly, and the sipe includes a first widened portion in which a portion that expands in a direction intersecting an extending direction of the sipe extends continuously from the tread surface toward a depth direction of the sipe, and a second widened portion in which a portion that expands in a direction intersecting the extending direction of the sipe extends continuously in a direction intersecting at least one of the first widened portions.

Another tire of the present disclosure is a tire in which at least one land portion is defined on a tread surface of the tire between grooves or between a groove and a tread edge by at least one groove and a tread edge, where the at least one land portion includes at least one sipe extending linearly, and in a cross section orthogonal to an extending direction of the sipe, the sipe includes at least one bent portion, at least one of the bent portions has a widened portion in which a width of sipe portions sandwiching the bent portion is increased, and at least one of the widened portions has a straight line portion, in which an angle formed with a line segment orthogonal to a normal line at an opening center of the sipe on the tread surface is 30° or more, in a wall surface on a major angle side of the bent portion of wall surfaces that define the widened portion.

As used herein, the "tread edge" means a ground contact end when the tire is mounted on an applicable rim, inflated at a prescribed internal pressure, and is loaded with a prescribed load. The "applicable rim" is an industrial standard effective in areas where tires are manufactured and used, such as the rim prescribed in JATMA (Japan Automobile Tyre Manufacturers Association) YEAR BOOK in Japan, the rim prescribed in ETRTO (European Tyre and Rim Technical Organisation) STANDARD MANUAL in Europe, and the rim prescribed in TRA (THE TIRE and RIM ASSOCIATION INC.) YEAR BOOK in the United States. In addition, the "prescribed internal pressure" is an air pressure corresponding to the maximum load (maximum load capacity) of a single wheel at an applicable size described in the above-mentioned industry standards, and the "prescribed load" is the maximum load (maximum load capacity) of a single wheel at an applicable size specified in the above-mentioned industry standards.

In the present disclosure, a "major angle" means an angle larger than 180° and smaller than 360°, and a "minor angle" means an angle smaller than 180°.

Advantageous Effect

According to the present disclosure, it is possible to provide a tire with high drainage performance. In addition, according to the present disclosure, it is possible to provide a tire with excellent drainage performance where the drainage performance of a sipe is improved without impairing the steering stability obtained by bending the sipe.

BRIEF DESCRIPTION OF THE DRAWINGS

In the accompanying drawings:

FIG. 11 is a cross-sectional view of the land portion of FIG. 10 taken along a plane orthogonal to the extending direction of the sipe;

FIG. 14 is a cross-sectional perspective view of an example of the shape of a sipe of a land portion of a tire of Embodiment 2-3 of the present disclosure.

DETAILED DESCRIPTION

Embodiment 1-1

Figure 1:
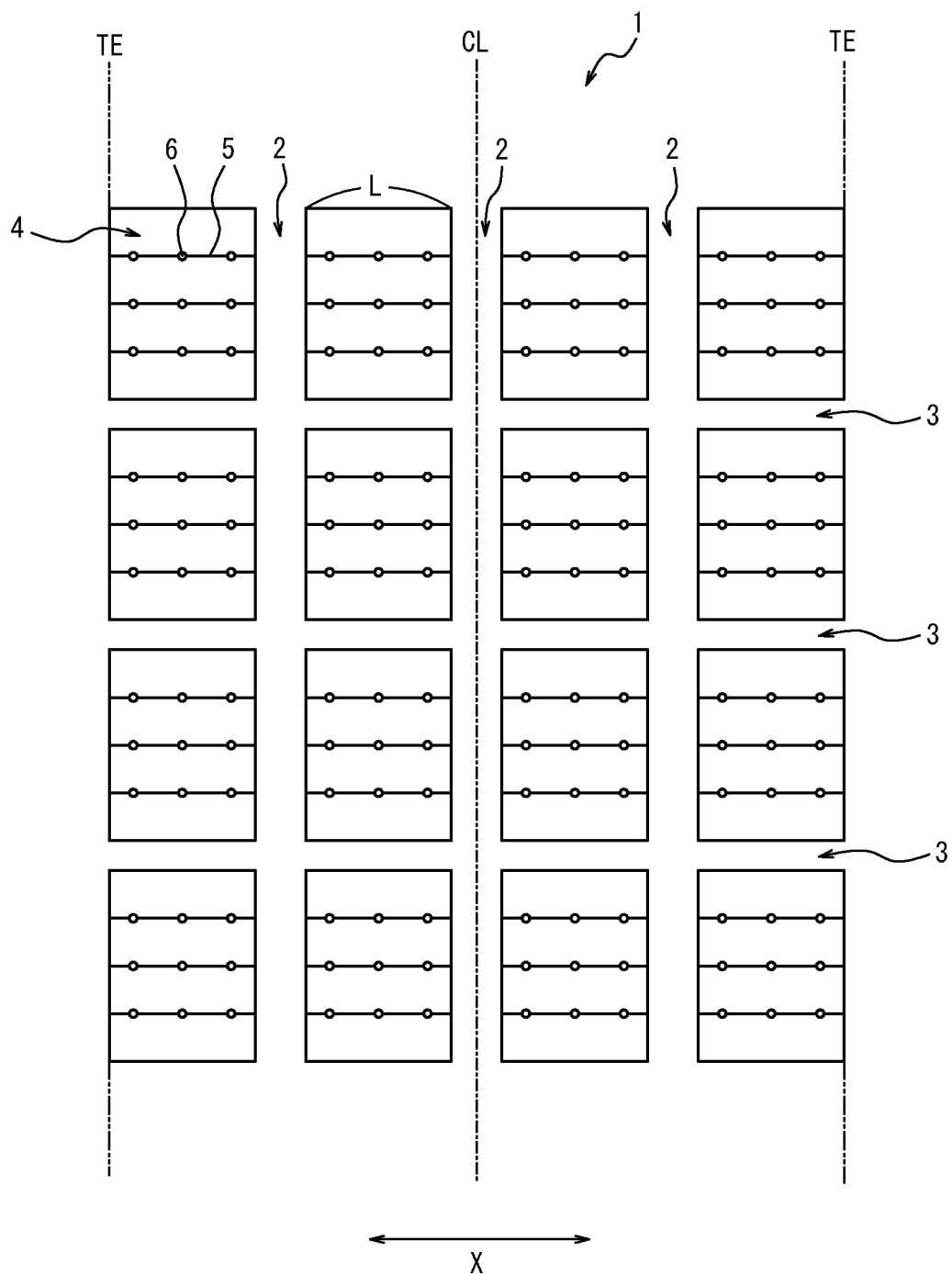
FIG. 1 is a developed view illustrating a tread surface of a tire of Embodiment 1-1 of the present disclosure.
Figure 2:
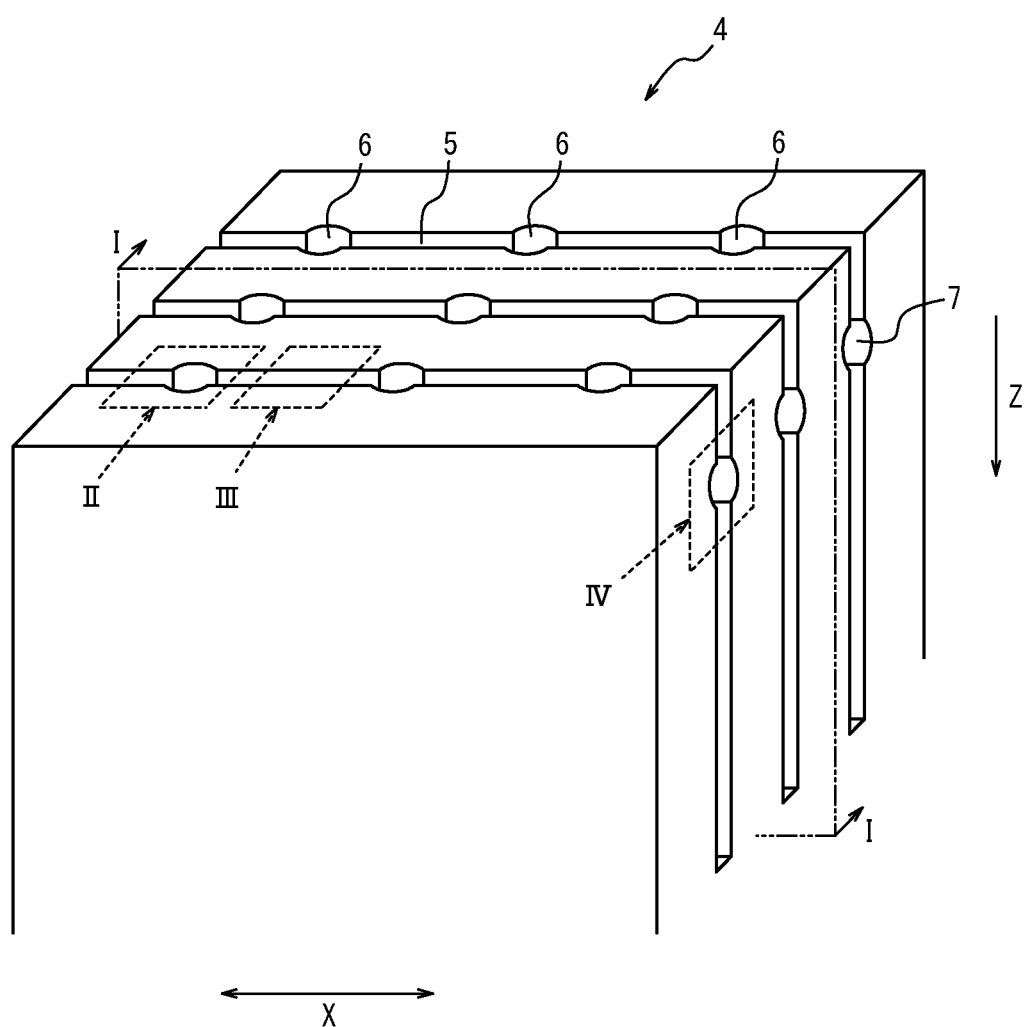
FIG. 2 is a perspective view of a land portion of the tire of Embodiment 1-1 of the present disclosure.

The following describes the presently disclosed tire in detail by illustrating its embodiments with reference to the drawings. FIG. 1 is a developed view illustrating a tread surface of a tire of an embodiment of the present disclosure, and FIG. 2 is a perspective view of a land portion of a tire of an embodiment of the present disclosure. The internal reinforcing structure and the like of the presently disclosed tire are similar to those of a general tire, and for example, a carcass extending in a toroidal form across a pair of bead cores is provided as a skeleton, two layers of belts are provided on the outer side of the carcass in the tire radial direction, and a tread is provided on the outer side of the belts in the tire radial direction. In the tread, a surface between the tread edges TE illustrated in the drawings is a tread surface of the tread (hereinafter, referred to as "tread surface 1").

The presently disclosed tire is a tire in which at least one land portion is defined on the tread surface 1 of the tire between grooves or between a groove and a tread edge by at least one groove and a tread edge. In the illustrated example, the tread surface 1 has three circumferential grooves 2 extending along the tire equator CL, a plurality of widthwise grooves 3 extending in the tread width direction, and a plurality of block land portions 4 defined by the circumferential grooves 2 and the tread edges TE and the widthwise grooves 3.

In FIG. 1, there are four block rows in which the block land portions 4 are arranged in the tread circumferential direction. However, the present disclosure is not limited to this form, and the number of block rows is arbitrary. In addition, although the arrangement of the blocks is symmetric with respect to the tire equator CL in the illustrated example, it may be asymmetric. Further, although the land portion illustrated in FIG. 1 is in a block shape, it may be in a rib-like shape. Furthermore, although the block land portion 4 is in a rectangular shape in the developed view, it may be in another shape such as a triangular shape or a polygonal shape with five or more angles.

The presently disclosed tire includes at least one, in FIG. 2, three sipes 5 extending in the tread width direction whose opening on the tread surface extends linearly in at least one land portion, in the illustrated example, all block land portions 4. The number of sipes 5 is not limited as long as it is one or more. Including one or more sipes 5 can improve the drainage performance while suppressing a decrease in rigidity of the block land portion 4.

Although the sipe 5 extends linearly on the tread surface 1 in FIGS. 1 and 2, it may be curved or bent (zigzag-shaped). In addition, although the sipe 5 extends linearly in the sipe depth direction (Z direction) in FIG. 2, it may be curved or bent (zigzag-shaped).

Further, although the sipe 5 extends along the tread width direction in the illustrated example, it may extend in a direction inclined with respect to the tread width direction or a direction along the circumferential direction.

Figure 3:
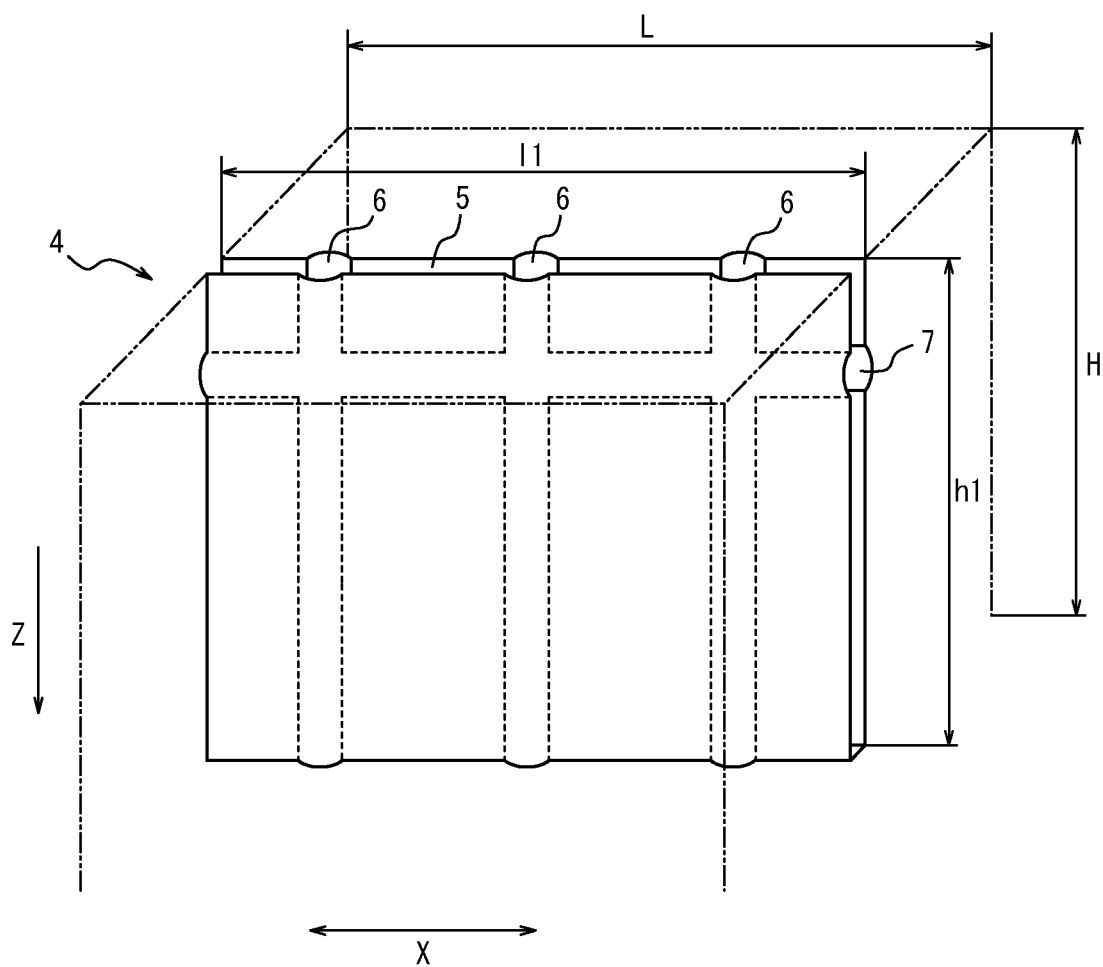
FIG. 3 is a perspective view of the land portion illustrated in FIG. 2.
Figure 4:
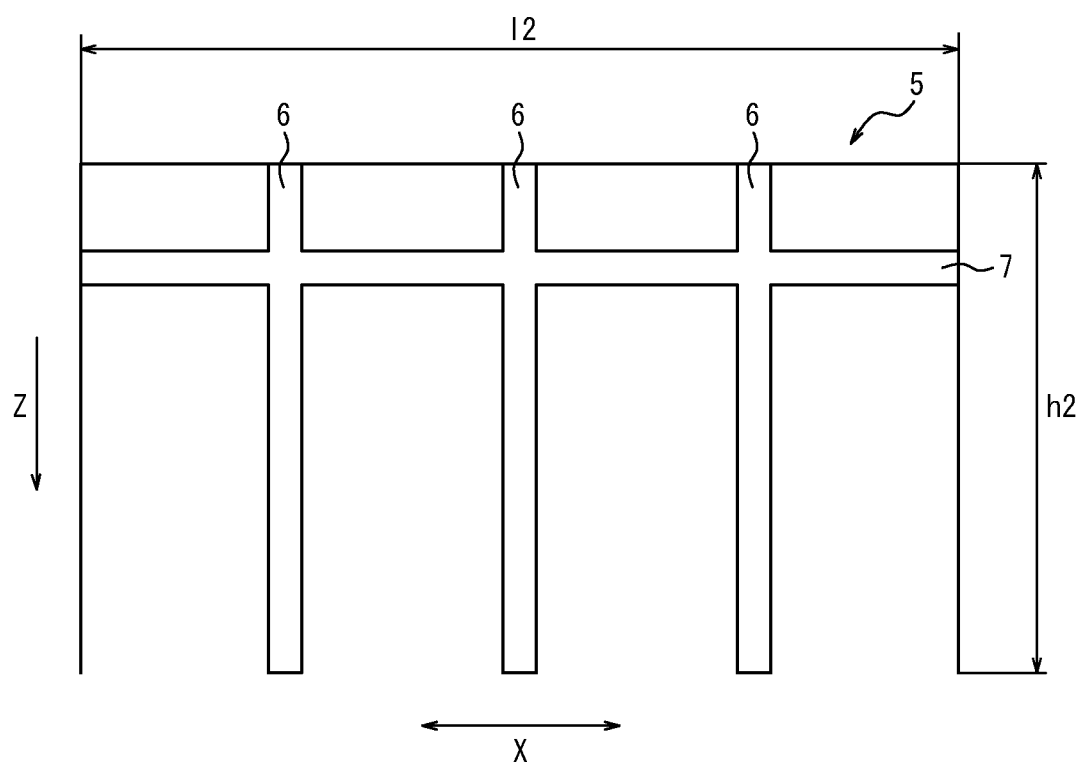
FIG. 4 is a cross-sectional view along the line I-I of FIG. 2.

FIG. 3 is a perspective view of the block land portion 4 illustrated in FIG. 2, and FIG. 4 is a cross-sectional view along the line I-I of FIG. 2.

As illustrated in FIGS. 2 and 3, the sipe 5 has a shape in which a cut having a certain depth from the tread surface extends linearly across the block land portion 4. The sipe 5 includes a first widened portion 6 in which a portion that expands in a direction intersecting the extending direction X of the sipe 5 extends continuously from the tread surface 1 toward the depth direction Z of the sipe 5, and a second widened portion 7 in which a portion that expands in a direction intersecting the extending direction X of the sipe 5 extends continuously in a direction intersecting the first widened portion 6. In other words, for the first widened portion 6 in the example illustrated in FIGS. 2 and 3, a portion, which expands in an arc shape in a direction intersecting the extending direction X of the sipe 5, that is, a direction orthogonal to the extending direction X of the sipe 5, extends linearly and continuously from the tread surface 1 toward the depth direction Z of the sipe 5. For the second widened portion 7, as illustrated in FIGS. 2 and 3, a portion, which expands in an arc shape in a direction intersecting the extending direction of the sipe 5, that is, a direction orthogonal to the extending direction X of the sipe 5 in the illustrated example, extends linearly and continuously in a direction intersecting at least one first widened portion 6, that is, a direction orthogonal to all the first widened portions 6 in the illustrated example. The first widened portion 6 and the second widened portion 7 extend linearly in the illustrated example. However, the first widened portion 6 and the second widened portion 7 only need to extend along the shape of the sipe 5 and have a shape based on the shape of the sipe.

According to the tire of the present embodiment, when the sipe 5 formed in the block land portion 4 comes into contact with a road surface, the first widened portion 6 continuous in the sipe depth direction Z takes a sufficient amount of water into the sipe 5, and the water flows into the second widened portion 7 continuous along the sipe extending direction X and is drained from the groove and the tread edge via the second widened portion 7.

Figure 5A:
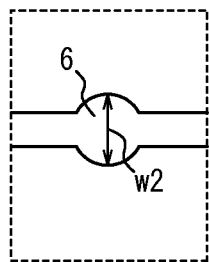
FIG. 5A illustrates the portion II of FIG. 2.
Figure 5B:
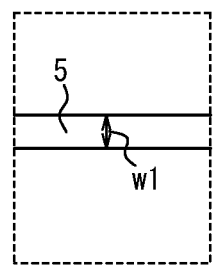
FIG. 5B illustrates the portion III of FIG. 2.
Figure 5C:
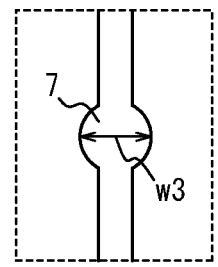
FIG. 5C illustrates the portion IV of FIG. 2.

FIG. 5A illustrates the portion II of FIG. 2, FIG. 5B illustrates the portion III of FIG. 2, and FIG. 5C illustrates the portion IV of FIG. 2. In addition, FIGS. 5D to 5F illustrate variations of the portion II.

For the first widened portion 6 of FIG. 5A, the portion that expands in an arc shape in the direction orthogonal to the sipe extending direction X is in an opposed-circular shape and is, as a whole, a cylindrical space continuous in the sipe depth direction Z, and it serves as a lead-out path of the water in the ground contact surface via this space. Note that the first widened portion 6 is not limited to a cylinder, and the cross-sectional shape thereof is not particularly limited as long as it has a width that exceeds the width in the direction orthogonal to the sipe extending direction X. For example, the first widened portion 6 may certainly be an elliptic cylinder whose cross-sectional shape is an ellipse, as illustrated in FIG. 5D, or a polygonal cylinder whose cross-sectional shape has three or more angles such as being a tetragon, as illustrated in FIG. 5E. It may also be a cylinder with an irregular cross section, as illustrated in FIG. 5F. It is preferably in a cylindrical shape from the viewpoint of drainage performance and removal from a mold when removing the tire from a mold during manufacture.

It is more preferable that the maximum diameter w2 of the cross-sectional shape of the first widened portion 6 be 200% or more of the maximum width w1 of the sipe 5 in the direction orthogonal to the sipe extending direction X, that is, the maximum width w1 of the sipe 5 excluding the first widened portion 6 and the second widened portion 7, as in the illustrated example. A too large maximum diameter adversely affects the rigidity of the block land portion 4. Therefore, the maximum diameter w2 of the first widened portion 6 is preferably 450% or less of the maximum width w1 of the sipe 5.

Figure 5D:
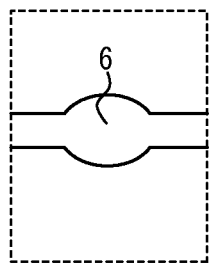
FIG. 5D illustrates a variation of the portion II.
Figure 5E:
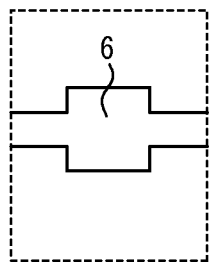
FIG. 5E illustrates a variation of the portion II.
Figure 5F:
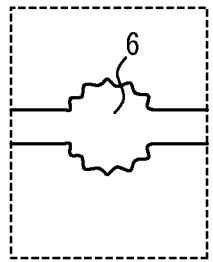
FIG. 5F illustrates a variation of the portion II.

Even when the first widened portion 6 is not in a circular shape, such as the cases illustrated in FIGS. 5D to 5F, the maximum diameter w2 means the maximum diameter of the cross-sectional shape.

FIG. 5C is a cross-sectional view along the line IV-IV of FIG. 2.

For the second widened portion 7 of the illustrated example, the portion that expands in an arc shape in the direction orthogonal to the sipe extending direction X is, as a whole, a cylindrical space continuous in the direction orthogonal to the first widened portion 6, and it serves as a lead-out path of the water taken into the sipe 5. Note that the second widened portion 7 is not limited to the cylinder of the illustrated example, and the cross-sectional shape thereof is not particularly limited as long as it has a width that exceeds the width in the direction orthogonal to the sipe extending direction X. For example, the second widened portion 7 may certainly be an elliptic cylinder whose cross-sectional shape is an ellipse, as illustrated in FIG. 5D, or a polygonal cylinder whose cross-sectional shape has three or more angles, as illustrated in FIG. 5E. It may also be a cylinder with an irregular cross section, as illustrated in FIG. 5F. It is preferably in a cylindrical shape from the viewpoint of drainage performance, prevention of cracks around the sipe, and removal from a mold when removing the tire from a mold during manufacture.

It is more preferable that the maximum diameter w3 of the cross-sectional shape of the second widened portion 7 be 200% or more of the maximum width w1 of the sipe 5 in the direction orthogonal to the sipe extending direction X, that is, the maximum width w1 of the sipe 5 excluding the first widened portion 6 and the second widened portion 7, as in the illustrated example. A too large maximum diameter adversely affects the rigidity of the block land portion 4. Therefore, the maximum diameter w3 of the second widened portion 7 is preferably 450% or less of the maximum width w1 of the sipe 5.

Even when the second widened portion 7 is not in a circular shape, such as the cases illustrated in FIGS. 5D to 5F, the maximum diameter w3 means the maximum width of the cross-sectional shape.

The maximum width w1 of the sipe 5 of the present embodiment is preferably 0.1 mm or more and 0.7 mm or less. When it is 0.1 mm or more, water can be taken in from an opening on the tread surface 1. When it is 0.7 mm or less, a decrease in rigidity of the block 1 and portion 4 can be suppressed.

In addition, the maximum width w2 of the first widened portion 6 and the maximum width w3 of the second widened portion 7 are preferably 0.8 mm or more and 1.6 mm or less. When they are 0.8 mm or more, it is possible to take in a sufficient amount of water from an opening of the first widened portion 6 on the tread surface 1 and to efficiently exhibit the function of taking in and draining water. When they are 1.6 mm or less, a decrease in rigidity of the block land portion 4 can be suppressed.

In the present embodiment, each sipe 5 includes three first widened portions 6, as illustrated in FIGS. 2 and 3. However, the number of first widened portions 6 included in each sipe 5 is not limited as long as it is one or more. Including one or more first widened portions 6 can improve the drainage performance while suppressing a decrease in rigidity of the block land portion 4.

In addition, in the block land portion 4, the number of first widened portions 6 included in the sipe 5 is three for each sipe 5 in the illustrated example, yet the number may be different for each sipe 5.

The second widened portion 7 of the present embodiment is in a similar manner with the above, where the number of the second widened portions 7 included in each sipe 5 is not limited as long as it is one or more. It is one in the illustrated example. Including one or more second widened portions 7 can improve the drainage performance while suppressing a decrease in rigidity of the block land portion 4.

In addition, the number of second widened portions 7 included in each sipe 5 in the block land portion 4 may be the same as or different from each other.

For the example illustrated in FIG. 3, the first widened portions 6 are preferably arranged with an interval of L/5 or more and L/3 or less, where L is the length of the block land portion 4 in the tread width direction. When the interval is L/5 or more, a decrease in rigidity of the block land portion 4 can be suppressed. When the interval is L/3 or less, the drainage performance can be further improved.

In addition, adjacent first widened portions 6 may be arranged at equal intervals or different intervals.

When each sipe 5 includes two or more second widened portions 7, the second widened portions 7 are preferably arranged with an interval of H/3 or more, where H is the depth of the circumferential groove 2 defining the block land portion 4. According to this structure, a decrease in rigidity of the block land portion 4 can be suppressed.

In addition, adjacent second widened portions 7 may be arranged at equal intervals or different intervals.

In the present embodiment, the sipe 5 preferably extends across the block land portion 4 including the sipe 5, that is, opens to the circumferential groove 2 or the tread edge TE, as illustrated in FIGS. 1 and 2.

According to this structure, the water taken into the sipe 5 by the first widened portion 6 moves to the second widened portion 7, and then flows out of the sipe 5 from the end of the second widened portion 7 on the tread edge side as the tire rolls. In this way, the drainage performance can be efficiently improved.

The sipe 5 is not limited to a two-side opening shape that extends across the block land portion 4, and may be in a one-side opening shape that only opens to either the circumferential groove 2 or the tread edge TE.

In the present embodiment, the second widened portion 7 preferably extends in the direction orthogonal to the first widened portion 6. That is, in the cross section illustrated in FIG. 4, the crossing angle between the first widened portion 6 and the second widened portion 7 is a right angle, and this can accelerate the taking in and draining of water as the tire rolls.

In the present embodiment, the second widened portion 7 is preferably arranged at a position that is 10% or more and 90% or less of the depth direction length h1 of the sipe 5 from the tread surface 1, as illustrated in FIG. 3. When it is arranged at a position of 10% or more, a decrease in rigidity of the block land portion 4 can be suppressed. When it is arranged at a position of 90% or less, it is possible to prevent the water that flows in from an opening of the sipe 5 including the first widened portion 6 from staying in the vicinity of the opening at the time of taking in water, and to accelerate the taking in of water. It is more preferably arranged at a position that is 20% or more and 60% or less, which is for the purpose of optimizing the drainage performance while maintaining the rigidity of the block land portion 4.

In the present embodiment, the depth direction length h2 of the first widened portion 6 illustrated in FIG. 4 is preferably the same as the depth direction length h1 of the sipe 5 illustrated in FIG. 3. According to this structure, the water taken in from an opening of the first widened portion 6 on the tread surface 1 can efficiently flow to the bottom of the sipe 5 in the depth direction and be efficiently drained.

The depth direction length h2 of the first widened portion 6 may be 5% or more and 90% or less of the depth direction length h1 of the sipe 5. When it is 5% or more, high drainage performance can be achieved. When it is 90% or less, a decrease in rigidity of the block land portion 4 can be suppressed.

In the present embodiment, the extension length 12 of the second widened portion 7 illustrated in FIG. 4 is at least 50% or more, more preferably 100%, of the extending direction length 11 of the sipe 5. In addition, it is preferably 90% or less from the viewpoint of the rigidity of the block 1 and portion 4.

In the present embodiment, the sipe 5 includes three first widened portions 6 and one second widened portion 7, all of which intersect. However, there may be at least one intersection. For example, when a first widened portion 6 is located at a position in the extending direction of the sipe 5 where no second widened portion 7 is arranged, at least one of the first widened portions 6 does not intersect the second widened portion 7. For another example, in the case where the sipe 5 includes two or more second widened portions 7, when the first widened portion 6 ends in the middle of the depth direction of the sipe 5 and a second widened portion 7 is located at a position that is deeper in the depth direction of the sipe 5 than the end position of the first widened portion 6, at least one of the second widened portions 7 does not intersect the first widened portion 6.

Embodiment 1-2

Figure 6:
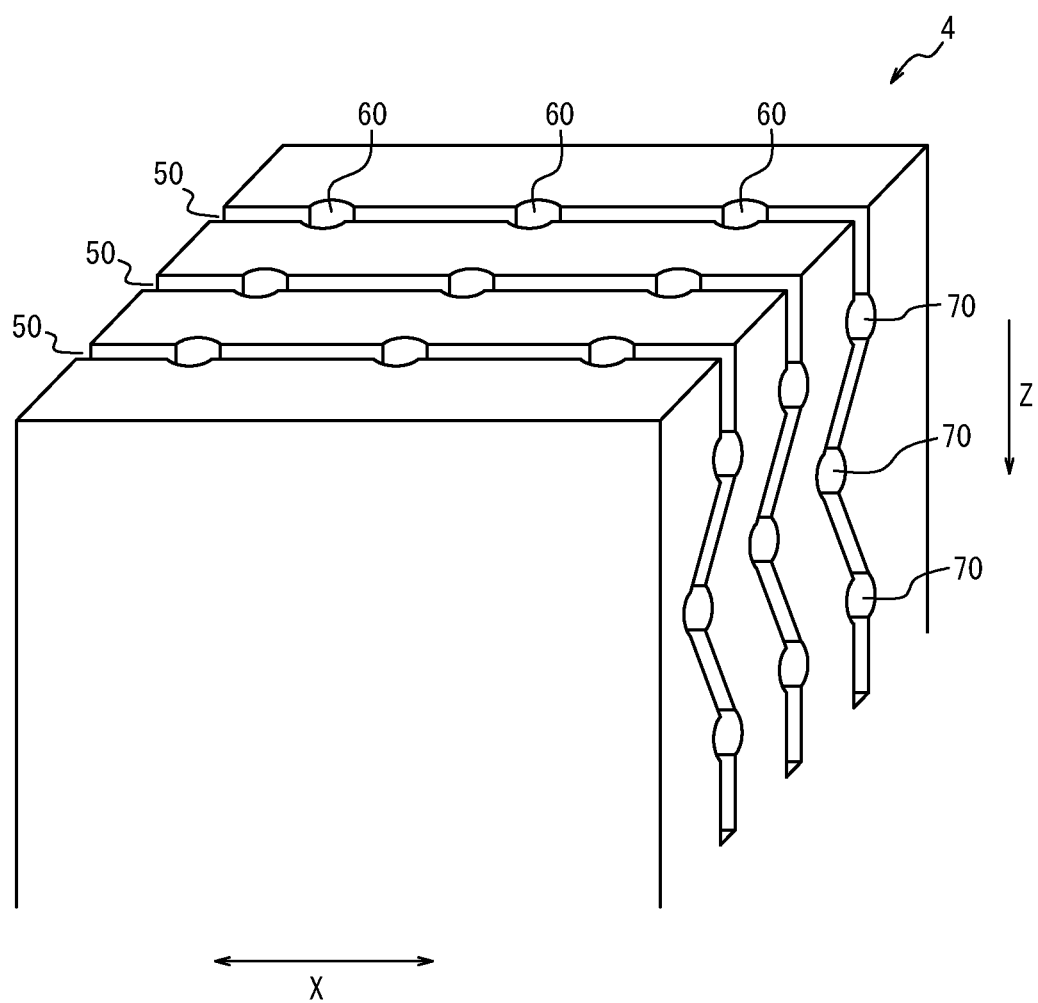
FIG. 6 is a perspective view of a land portion of a tire of Embodiment 1-2 of the present disclosure.
Figure 7:
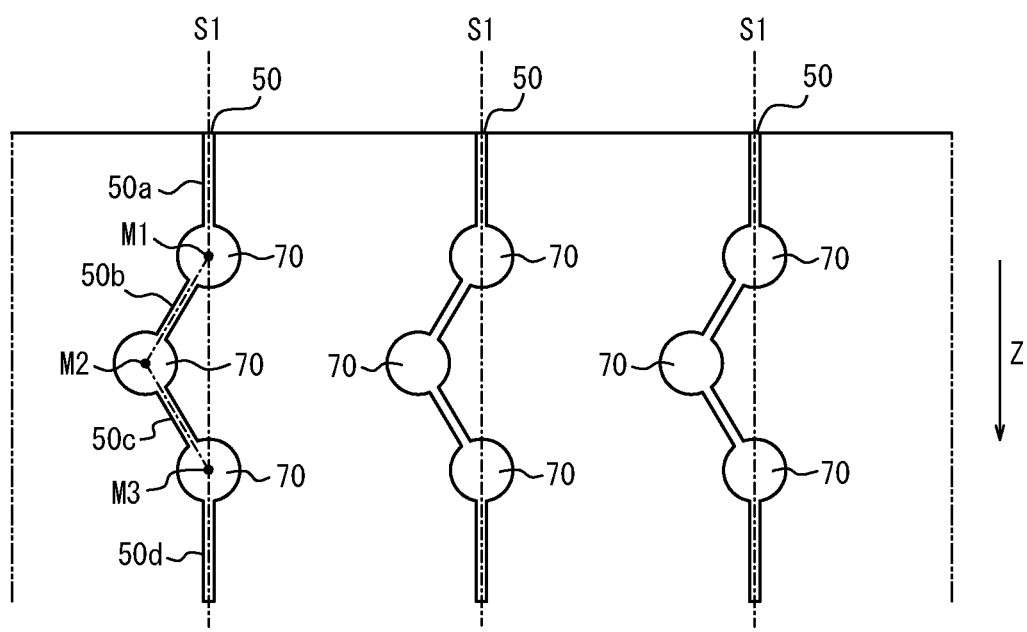
FIG. 7 illustrates a side surface of the land portion of FIG. 6.

Next, a case where the sipe includes a bending point in the depth direction will be described with reference to FIGS. 6 and 7. FIG. 6 is a perspective view of a block land portion 4 of a tire of Embodiment 1-2 of the present disclosure, and FIG. 7 illustrates a side surface of the block land portion 4. In FIGS. 6 and 7, components similar to those in FIGS. 1 to 5F are given the same reference signs as in FIGS. 1 to 5F and the description thereof is omitted. In the present embodiment, the sipe 50 includes an inclined portion extending from a reference surface S1 and passing through at least one bending point, where the reference surface S1 is a surface extending in the depth direction of the sipe 50 from an opening of the sipe 50 based on the shape of the opening. The shape of the sipe 50 will be described in detail below with reference to FIGS. 6 and 7.

As illustrated in FIG. 6, the sipe 50 extends linearly in the tread width direction on the tread surface 1. In addition, as illustrated in FIG. 7, the sipe 50 includes a vertical portion 50a along the reference surface S1, where the reference surface S1 is a surface extending in the sipe depth direction, that is, the Z direction, from the opening of the sipe 50 on the tread surface 1 based on the shape of the opening, an inclined portion 50b inclined to one side of the vertical portion 50a via a bending point M1, an inclined portion 50c inclined with respect to the inclined portion 50b via a bending point M2 and returning to the reference surface S1 side, and a vertical portion 50d returning from the inclined portion 50c via a bending point M3 and extending along the reference surface S1.

Each of the bending points M1 to M3 is preferably arranged at a position that is 10% or more and 90% or less of the depth direction length of the sipe 50. This arrangement can improve the drainage performance while improving the effect of suppressing a decrease in rigidity of the block land portion 4.

The sipe 50 includes a first widened portion 60 and a second widened portion 70, which is in the same manner as the above-described sipe 5 including the first widened portion 6 and the second widened portion 7. Each first widened portion 60 and second widened portion 70 is the same as the first widened portion 6 and the second widened portion 7 described above. That is, the number, shape, maximum diameter and the like of the widened portions are the same as described above. However, the second widened portion 70 is preferably arranged at at least one bending point of the sipe 50, in the illustrated example, M1 to M3. Arranging the second widened portion 70 at each of the bending points M1 to M3 can suppress a decrease in rigidity of the block land portion 4 as compared with the case of arranging the second widened portion 70 at other positions. In this way, it is possible to improve the drainage performance while maintaining the rigidity of the block land portion 4.

In the present embodiment, the sipe 5 has a plurality of bending points. However, the sipe 5 may be in another shape as long as it has at least one bending point. For example, the sipe 5 may be in a shape including four or more bending points.

Figure 8:
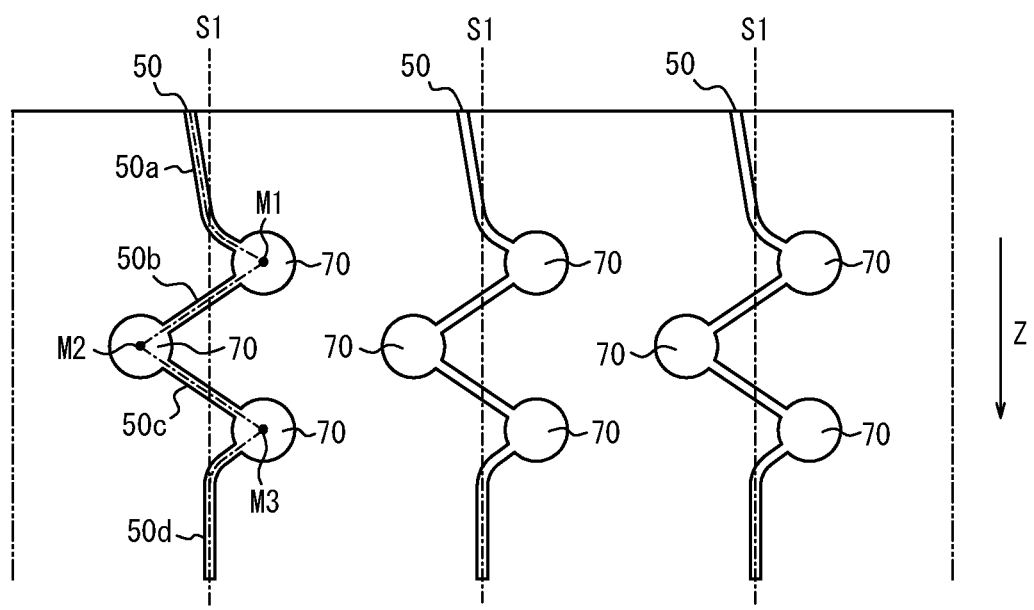
FIG. 8 illustrates a modified example of the side surface of FIG. 7.

A modified example of the sipe 50 of the present embodiment is illustrated in FIG. 8. FIG. 8 illustrates a modified example of the shape of the sipe 5 illustrated in FIG. 7 in the depth direction.

The example illustrated in FIG. 8 is an example in which curved portions are provided on the 50a side of M1 and the 50d side of M3 in the sipe 50 illustrated in FIG. 7. According to this shape, it is possible to improve the removal from a mold when removing the tire from a mold during manufacture, and to suppress a decrease in rigidity of the land portion.

Embodiment 1-3

An example in which the sipe includes bending points in the extending direction on the tread surface 1 and in the depth direction will be described with reference to FIG. 9.

Figure 9:
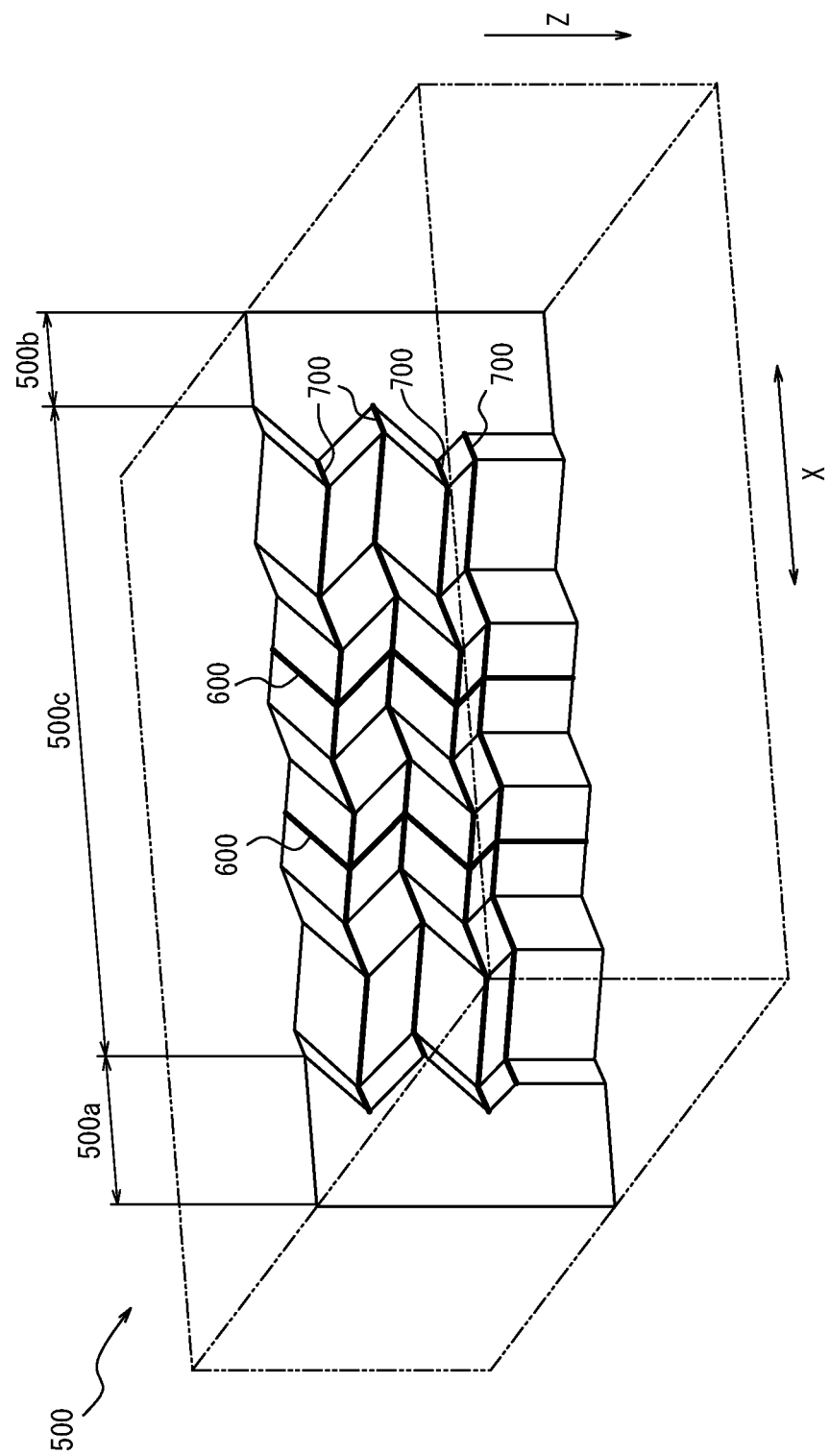
FIG. 9 is a cross-sectional perspective view of an example of the shape of a sipe of a land portion of a tire of Embodiment 1-3 of the present disclosure.

First, as the opening shape of the sipe 500 on the tread surface illustrated in FIG. 9, the sipe 500 includes straight line-shaped portions 500a and 500b that extend linearly at the two ends of the sipe 500 extending across the block land portion 400 respectively, and a broken line-shaped portion 500c that extends between the two straight line-shaped portions 500a and 500b and passes through a plurality of bending points.

The straight line-shaped portions 500a and 500b are planes extending in the sipe depth direction along the opening shape. For the broken line-shaped portion 500c sandwiched between the straight line-shaped portions, each side portion of the broken line (zigzag), which is the opening shape, is formed by combining displacement surfaces, where each displacement surface is displaced in a broken-line shape (a zigzag shape) and extends in the sipe depth direction.

The sipe 500 includes a first widened portion 600 and a second widened portion 700, which is in the same manner as the above-described sipe 5 and sipe 50.

In the present embodiment, the second widened portion 700 is preferably arranged at a position where a bending point is formed in the depth direction of the sipe 500. According to this structure, the effect of supporting the side walls that define the sipe 500 is most unlikely to decrease, and the drainage performance can be improved while suppressing a decrease in rigidity of the block land portion 4. In the illustrated example, the second widened portion 700 is arranged along the broken line-shaped portion 500c on the tread surface. However, the second widened portion 700 can also be arranged along the straight line-shaped portions 500a and 500b.

In addition, from the viewpoint of suppressing a decrease in rigidity of the block land portion 4, the first widened portion 600 preferably extends in the sipe depth direction from the middle of each side of the broken line of the sipe 500 on the tread surface.

Embodiment 2-1

Figure 10:
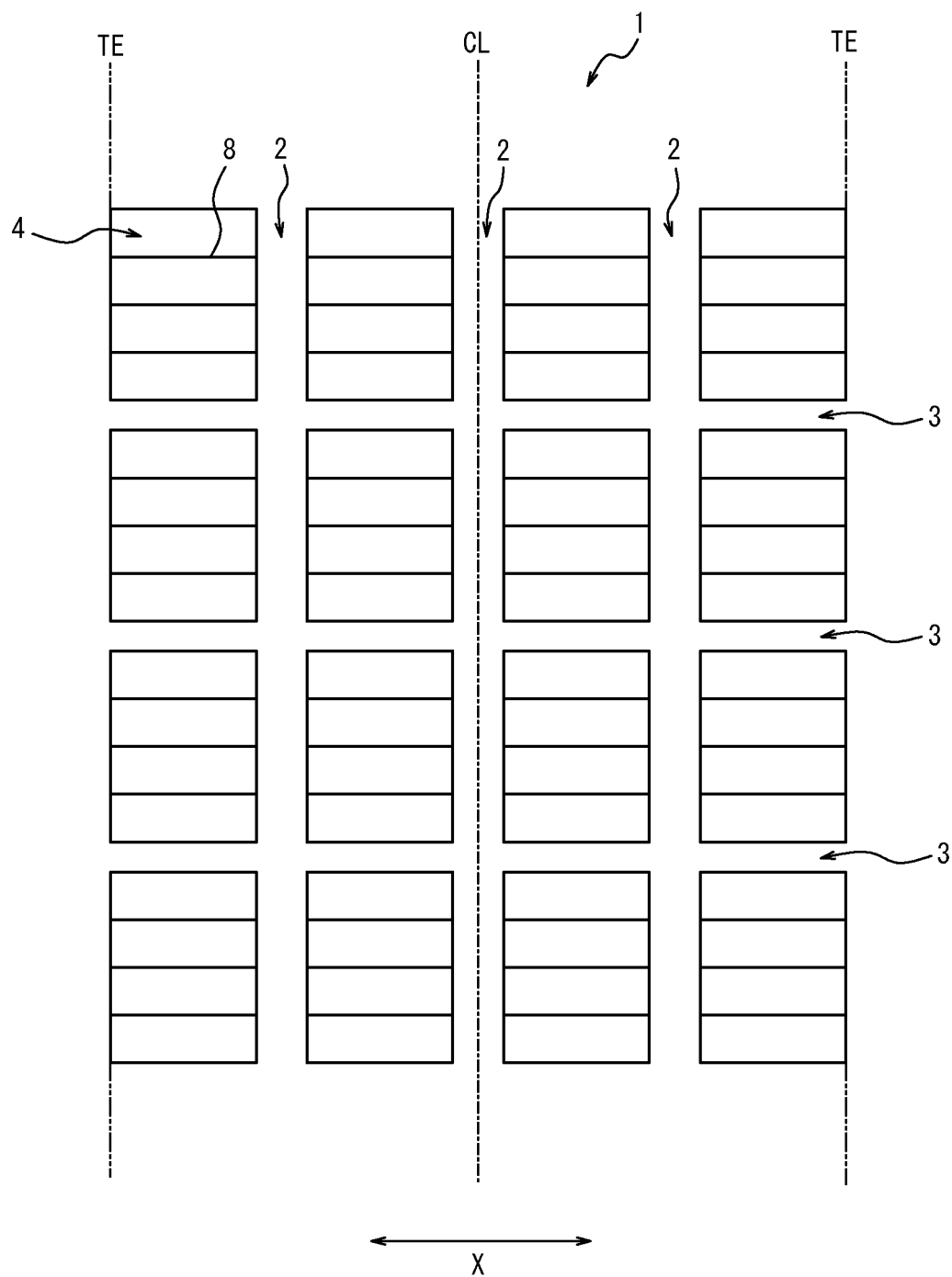
FIG. 10 is a developed view illustrating a tread surface of a tire of Embodiment 2-1 of the present disclosure.

FIG. 10 is a developed view illustrating a tread surface of a tire of Embodiment 2-1 of the present disclosure. The internal reinforcing structure and the like of the presently disclosed tire are similar to those of a general tire, and for example, a carcass extending in a toroidal form across a pair of bead cores is provided as a skeleton, two layers of belts are provided on the outer side of the carcass in the tire radial direction, and a tread is provided on the outer side of the belts in the tire radial direction. In the tread, a surface between the tread edges TE illustrated in the drawings is a tread surface of the tread (hereinafter, referred to as "tread surface 1").

The presently disclosed tire is a tire in which at least one land portion is defined on the tread surface 1 of the tire between grooves or between a groove and a tread edge by at least one groove and a tread edge. In the illustrated example, the tread surface 1 has three circumferential grooves 2 extending along the tire equator CL, a plurality of widthwise grooves 3 extending in the tread width direction, and a plurality of block land portions 4 defined by the circumferential grooves 2 and the tread edges TE and the widthwise grooves 3.

In FIG. 10, there are four block rows in which the block land portions 4 are arranged in the tread circumferential direction. However, the present disclosure is not limited to this form, and the number of block rows is arbitrary. In addition, although the arrangement of the blocks is symmetric with respect to the tire equator CL in the illustrated example, it may be asymmetric. Further, although the land portion illustrated in FIG. 10 is in a block shape, it may be in a rib-like shape. Furthermore, although the block land portion 4 is in a rectangular shape in the developed view, it may be in another shape such as a triangular shape or a polygonal shape with five or more angles.

The tire includes at least one, in FIG. 10, three sipes 8 extending in the tread width direction whose opening on the tread surface extends linearly in at least one land portion, in the illustrated example, all block land portions 4. The number of sipes 8 is not limited as long as it is one or more. Including one or more sipes 8 can improve the drainage performance of the tire.

Although the sipe 8 extends linearly on the tread surface 1 in FIG. 10, it may be curved or bent (zigzag-shaped).

In addition, although the sipe 8 extends along the tread width direction in the illustrated example, it may extend in a direction inclined with respect to the tread width direction or a direction along the circumferential direction.

Figure 12A:
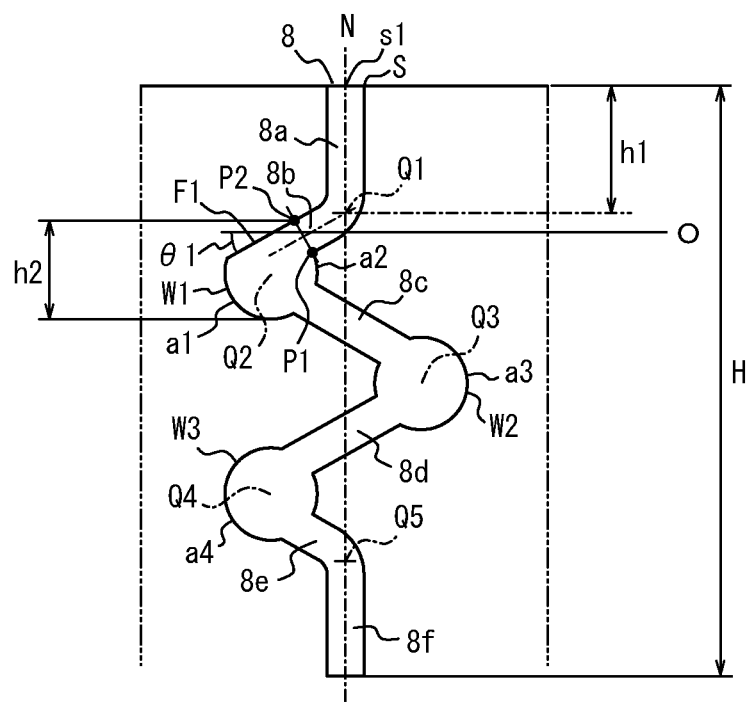
FIG. 12A is an enlarged view of one of the sipes of FIG. 11.

FIG. 11 is a cross-sectional view of the land portion of FIG. 10 taken along a plane orthogonal to the extending direction X of the sipe 8, and FIG. 12A is an enlarged view of one of the sipes 8 of FIG. 11.

In the present embodiment, the sipe 8 curves and extends through at least one bent portion in a cross section orthogonal to the extending direction X of the sipe 8. In the example illustrated in FIGS. 11 and 12A, the sipe 8 curves and extends through bent portions Q1 to Q5 from the tread surface side toward the sipe depth direction.

As illustrated in FIG. 12A, the sipe 8 has a straight portion 8a that extends in the normal line N direction from the opening center s1 of the sipe 8 on the tread surface 1. Then, a first inclined portion 8b is formed from the straight portion 8a, where the first inclined portion 8b extends so that it is inclined with respect to the normal line N via the bent portion Q1. Subsequently, a second inclined portion 8c is formed, where the second inclined portion 8c extends so that it is inclined with respect to the normal line N to the opposite side of the first inclined portion 8b via the bent portion Q2. Subsequently, a third inclined portion 8d is formed, where the third inclined portion 8d extends so that it is inclined with respect to the normal line N to the opposite side of the second inclined portion 8c via the bent portion Q3. Subsequently, a fourth inclined portion 8e is formed from the third inclined portion 8d, where the fourth inclined portion 8e extends so that it is inclined with respect to the normal line N to the opposite side of the third inclined portion 8d via the bent portion Q4, and a straight portion 8f is formed, where the straight portion 8f extends in the normal line N direction via the bent portion Q5.

When the sipe 8 is provided with bent portions, the wall surfaces facing each other across the sipe mesh with each other as the tire rolls, and the land portion can be prevented from collapsing even if a sipe is provided. In this way, a decrease in rigidity of the block land portion 4 can be suppressed.

In the present embodiment, when the sipe 8 is formed with a portion extending in the normal line N direction and a portion extending in a direction inclined with respect to the normal line N, the depth direction of the sipe 8 is the same as the direction along the normal line N, as described above. However, the depth direction of the sipe may be inclined with respect to the normal line N.

In the present embodiment, each of the bent portions Q1 to Q5 is preferably disposed at a position that is 10% or more and 90% or less of the depth direction length H of the sipe 8 from the tread surface 1.

This is for the purpose of further effectively suppressing a decrease in rigidity of the block land portion 4.

In the above-described sipe 8, at least one of the bent portions Q1 to Q5 has a widened portion in which the width of the sipe portions sandwiching the bent portion is increased. In the illustrated example, the bent portions Q2, Q3 and Q4 are provided with widened portions W1, W2 and W3 respectively. In the present embodiment, each widened portion W1 is continuous along the extending direction X of the sipe 8 while maintaining the cross-sectional shape.

According to this structure, when the sipe 8 formed in the block land portion 4 comes into contact with a road surface, the water taken in from an opening S passes through each widened portion, flows in the sipe depth direction without stagnation, and is drained from the groove and the tread edge via the widened portion.

As illustrated in FIG. 12A, when the sipe portion and the widened portion are in a straight line on one side wall, the boundary between the sipe portion and the widened portion on the other side wall is defined as a point P1, and an intersection point between a line passing through the point P1 and orthogonal to a line drawn along the center of the width of the sipe portion, that is, the inclined portion 8b, and the side wall facing the point P1 is defined as a boundary point P2.

In the present embodiment, the sipe 8 preferably extends across the block land portion 4 including the sipe.

According to this structure, the water taken into the sipe 8 from the opening S moves into the widened portions W1 to W3, and then flows out of the sipe 8 from the end of each widened portion on the tread edge side as the tire rolls. In this way, the drainage performance can be further efficiently improved.

Figure 12B:
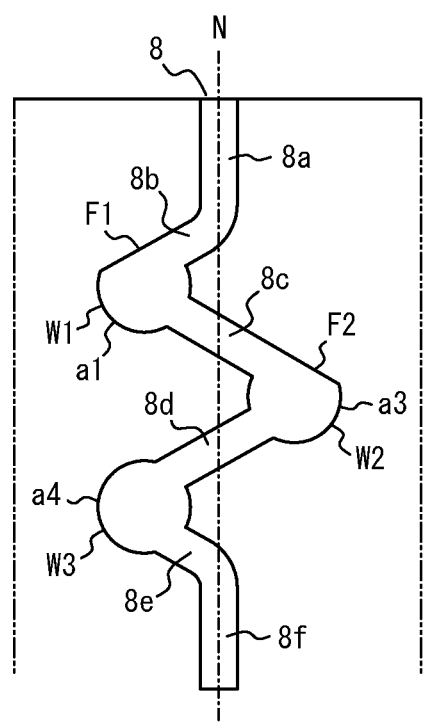
FIG. 12B illustrates a modified example of the sipe of FIG. 12A.

In the present embodiment, at least one of the widened portions, in FIG. 12B, the widened portion W1 has a straight line portion F1, in which an angle $\theta 1$ formed with a line segment O orthogonal to the normal line N at the opening center of the sipe on the tread surface is 30° or more, in a wall surface a1 on the major angle side of the bent portion Q2 of the wall surfaces that define the widened portion W1. That is, as illustrated in the drawing, the widened portion W1 of the sipe 8 is defined by a wall surface a2 on the minor angle side of the bending and a wall surface a1 on the major angle side, and the wall surface a1 on the major angle side includes a straight line portion F1 in which an angle $\theta 1$ formed with a line segment O orthogonal to the normal line N is 30° or more. In the illustrated example, the straight line portion F1 is formed on the tread surface 1 side of the wall surface a1 on the major angle side, that is, at a location continuous with the inclined portion 8b. Although the straight line portion F1 extends at the same angle as the inclined portion 8b with respect to the line segment O in the illustrated example, it is not limited to this structure.

According to the structure where the sipe 8 has a straight line portion F1 in which an angle formed with the line segment O orthogonal to the normal line N at the opening center s1 of the sipe is 30° or more, when the tire comes into contact with a road surface, the water that flows in from the opening S flows along the straight line portion F1 to the deep via the widened portion W1 without stagnation. In this way, the sipe 8 can take in water more efficiently. In addition, when water is drained out of the ground contact region of the sipe that takes in the water, the water flowing into the sipe 8 can be smoothly transported to the sipe portion on the tread surface side via the straight line portion F1. In this way, the water draining can be accelerated.

Further, by providing a straight line portion as a part of the widened portion, a decrease in rigidity of the block land portion 4 can be suppressed. This is because that the straight line portion is a flat surface along the extending direction of the sipe and can resist input of force when grounding on a road surface.

Although a straight line portion F1 is formed on the tread surface 1 side of the wall surface a1 on the major angle side that defines the widened portion W1 in the illustrated example, a straight line portion may be formed on the side that is separated from the tread surface 1 and is continuous with the inclined portion 8c.

In the present embodiment, the line segment O is preferably a line segment passing through the point P2, and the angle $\theta 1$ is preferably formed toward the depth direction of the sipe 8 from the line segment.

This is for the purpose of improving the effect of taking in water toward the depth direction of the sipe 8.

The angle $\theta 1$ of the straight line portion F1 with respect to the line segment O is preferably 35° to 75°.

According to this structure, it is possible to take in water more efficiently when the tire comes into contact with a road surface, and to accelerate the draining of water that has been taken in.

In the present embodiment, the widened portion W1 is in a circular shape except for the straight line portion F1 as illustrated in the drawing. However, the widened portion W1 may be in another shape. That is, the widened portion W1 may be in a shape in which a straight line portion F1 is formed as a part of an elliptical shape, a polygonal shape, an indefinite shape, or the like. However, from the viewpoint of preventing water from stagnating inside the widened portion, the widened portion is preferably in a circular shape except for the straight line portion F1 as illustrated in FIG. 12A.

In the present embodiment, the maximum diameter w2 of the widened portion W1 is preferably 200% or more and 450% or less of the maximum width w1 of the sipe portions sandwiching the bent portion Q2 where the widened portion W1 is formed, that is, the maximum width w1 of the inclined portions 8b and 8c.

As used herein, the maximum diameter of the widened portion means the maximum diameter of the cross-sectional shape regardless of the shape of the widened portion. In addition, the maximum width of the sipe portion means the maximum width of the cross-sectional shape.

That is, by enlarging the shape of the sipe 8 at the location where the sipe bends, it is possible to efficiently exhibit the function of taking in and draining water. On the other hand, a too large maximum diameter of the widened portion adversely affects the rigidity of the block land portion 4. Therefore, the maximum diameter w2 of the widened portion W1 is preferably 450% or less of the maximum width w1 of the sipe portion, that is, the maximum width w1 of the inclined portions 8b and 8c.

Figure 12C:
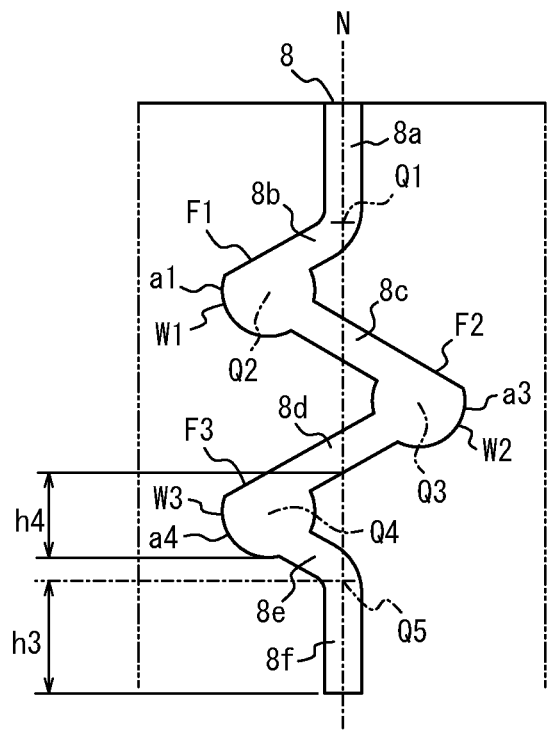
FIG. 12C illustrates a modified example of the sipe of FIG. 12A.

Although the straight line portion F1 is provided only in the widened portion W1 formed in the bent portion Q2 that is on the most tread surface 1 side in the example illustrated in FIG. 12A, the straight line portion may also be provided in other widened portions. FIG. 12B illustrates a modified example in which straight line portions F1 and F2 are provided in the widened portion W1 and the widened portion W2, and FIG. 12C illustrate a modified example in which straight line portions F1 to F3 are provided in the widened portions W1 to W3. In the present embodiment, a widened portion having a straight line portion is preferably provided in a bent portion sandwiched between sipe portions that are respectively inclined to one side and the other side with respect to the normal line N. That is, in FIG. 12A, a widened portion W1 having a straight line portion F1 is provided in a bent portion Q2 sandwiched between an inclined portion 8b inclined to one side with respect to the normal line N and an inclined portion 8c inclined to the other side with respect to the normal line N. The example in FIG. 12B is similar to that in FIG. 12A, where a widened portion W1 having a straight line portion F1 is provided in a bent portion Q2, and further, a widened portion W2 having a straight line portion F2 is provided in a bent portion Q3 sandwiched between an inclined portion 8d inclined to one side with respect to the normal line N and an inclined portion 8c inclined to the other side with respect to the normal line N. In FIG. 12C, widened portions having a straight line portion are provided in bent portions Q2 and Q3, and further, a widened portion W3 having a straight line portion F3 is provided in a bent portion Q4 sandwiched between an inclined portion 8d inclined to one side with respect to the normal line and an inclined portion 8e inclined to the other side with respect to the normal line.

In the examples illustrated in FIGS. 12A to 12C, the straight line portions F1, F2 and F3 are formed on the tread surface 1 side of the wall surfaces a1, a3 and a4 on the major side, respectively.

By providing a widened portion having a straight line portion in a bent portion sandwiched between sipe portions respectively inclined to one side and the other side with respect to the normal line N, it is possible to effectively enhance the drainage performance while suppressing a decrease in rigidity of the sipe.

In addition, as illustrated to FIG. 12B, by providing widened portions having a straight line portion in the bent portions Q2 and Q3, it is possible to more effectively enhance the drainage performance of the sipe while suppressing a decrease in rigidity of the block land portion 4. Further, as illustrated in FIG. 12C, by providing widened portions having a straight line portion in the bent portions Q2, Q3 and Q4, it is possible to even more effectively enhance the drainage performance of the sipe while suppressing a decrease in rigidity of the block land portion 4.

Figure 12D:
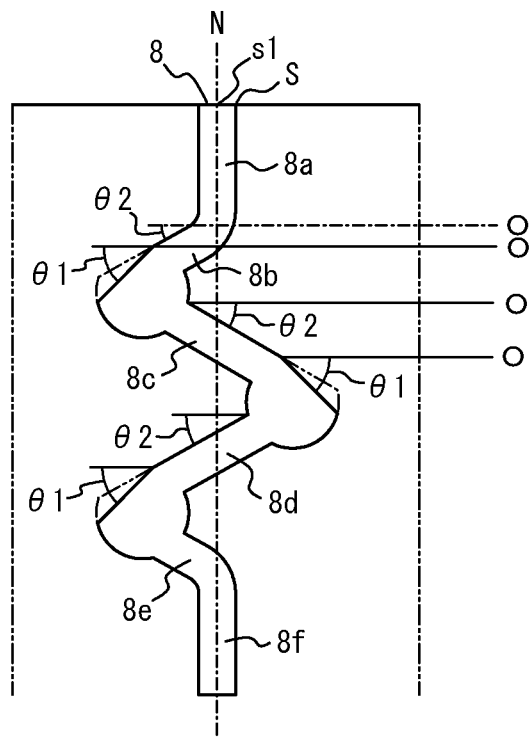
FIG. 12D illustrates a modified example of the sipe of FIG. 12A.

In the modified example illustrated in FIG. 12D, the straight line portion F1 is formed at an angle $\theta 1$ larger than the inclination angle $\theta 2$ which is between the sipe portion continuous with the straight line portion F1, that is, the inclined portion 8b, and the line segment O. In addition, each of the straight line portions F2 and F3 are also formed at an angle $\theta 1$ larger than the inclination angle $\theta 2$ which is between the inclined portion 8c continuous with the straight line portion F2 and the line segment O and between the inclined portion 8d continuous with the straight line portion F3 and the line segment O.

According to this structure, the drainage performance can be improved more efficiently.

Figure 12E:
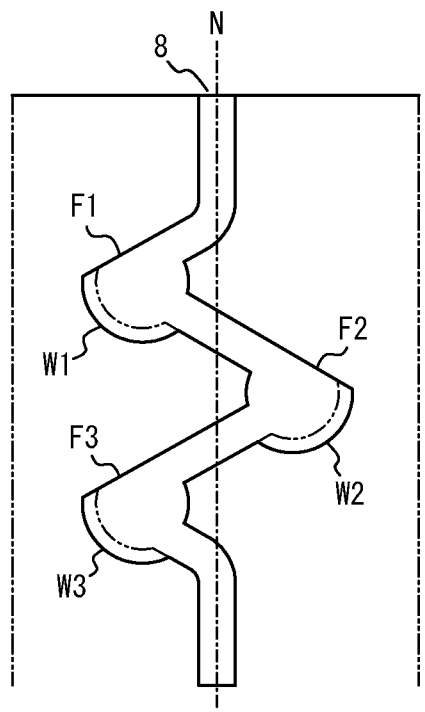
FIG. 12E illustrates a modified example of the sipe of FIG. 12A.

FIG. 12E also illustrates a modified example of the sipe 8. The sipe 8 of FIG. 12E is similar to the sipe 8 of FIG. 12D, where straight line portions F1 to F3 are provided in the widened portions W1 to W3. The widened portions W1 to W3 have a smaller cross-sectional area in the case where straight line portions F1 to F3 are provided than in the case where straight line portions F1 to F3 are not provided, in other words, the case where the cross-sectional shape is circular. In order to prevent the amount of water that can be taken in from decreasing as compared with the case where straight line portions F1 to F3 are not provided, the wall surface of a part of the widened portions W1 to W3 is further widened. In the illustrated example, a part of the wall surface constituting the major angle of the bent portions Q2 to Q4 where no straight line portion is provided is further widened.

According to this structure, it is possible to prevent a decrease in the amount of water that can be taken in while maintaining the effect of suppressing a decrease in drainage performance and rigidity due to the formation of straight line portions F1 to F3.

Figure 12F:
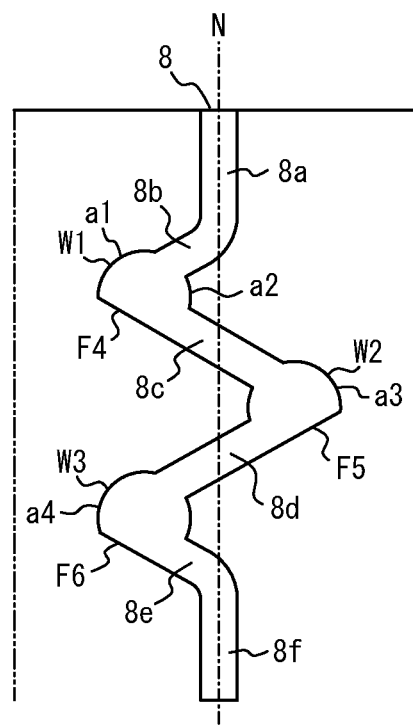
FIG. 12F illustrates a modified example of the sipe of FIG. 12A.

FIG. 12F illustrates another modified example of the sipe 8. As illustrated in FIG. 12F, a straight line portion F4 may be formed in the wall surface a1 on the major angle side of the widened portion W1 of the sipe 8 on the depth direction side of the sipe 8, that is, at a location continuous with the inclined portion 8c.

Further, in the illustrated example, a straight line portion F5 is formed on the side of the wall surface a3 on the major angle side of the widened portion W2 that is continuous with the inclined portion 8d, and a straight line portion F6 is formed on the side of the wall surface a4 on the major angle side of the widened portion W3 that is continuous with the inclined portion 8e.

Figure 12G:
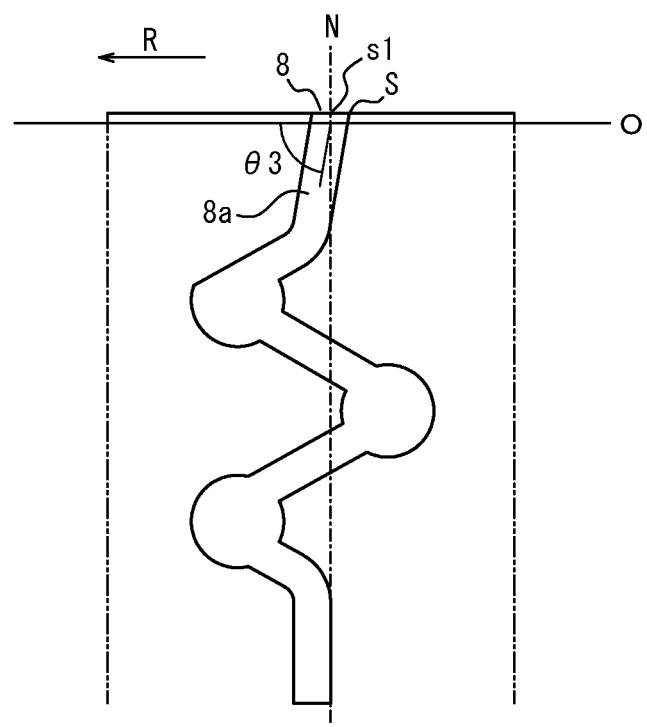
FIG. 12G illustrates a modified example of the sipe of FIG. 12A.

FIG. 12G illustrates a modified example of the sipe 8 of the present embodiment. FIG. 12G is an example in which the straight portion 8a of the sipe illustrated in FIG. 12A is inclined.

In other words, the example illustrated in FIG. 12G is an example in which the straight portion 8a extending from the opening center s1 of the sipe 8 on the tread surface 1 extends in a direction that is inclined with respect to the normal line N direction in the sipe 8 illustrated in FIG. 12A. It is preferable that a tire provided with the sipe 8 of this example be mounted with a predetermined rotation direction. In FIG. 12G, the tire rotation direction R is indicated by an arrow. In the illustrated example, the straight portion 8a is inclined at an angle θ3 to the rear of the rotation direction R with respect to a line segment O orthogonal to the normal line N of the tread surface 1, and the angle θ3 on the acute angle side is preferably in the range of 70° to 85°.

In the case where the straight portion 8a is in a shape that is inclined to the rear of the rotation direction R with respect to the tread surface 1, when the tire rolls and the block land portion 4 in contact with a road surface rotates in the rotation direction R, a longitudinal force in the direction opposite to the rotational direction R is generated in the block land portion 4, and the sipe 8 is deformed into a shape in which water on the road surface can be easily taken inside. In addition, a moment to rotate in the direction opposite to the rotation direction R is generated in the block land portion 4. As a result, the edge performance of the block land portion 4 with respect to the road surface is enhanced, and the steering stability on a wet road surface can be further improved.

In each example of the present embodiment, the sipe depth direction length h1 of the straight portion 8a is preferably 100% to 300% of the sipe depth direction length h2 from the end of the widened portion W1 on the tread surface side, that is, the point P2, to the end of the widened portion W1 in the sipe depth direction. When it is 100% or more, a decrease in rigidity of the land portion can be suppressed. When it is 300% or less, the drainage performance can be improved.

In addition, in the modified example of FIG. 12C, the sipe depth direction length h3 of the straight portion 8f is preferably 100% to 300% of the sipe depth direction length h4 from the end of the widened portion W3 on the tread surface side to the end of the widened portion W3 in the sipe depth direction. When it is 100% or more, a decrease in removal performance when removing the tire from a mold during manufacture can be suppressed. When it is 300% or less, a decrease in rigidity of the land portion can be suppressed.

At the time of vulcanization molding the tire of each example of the present embodiment, the sipe blade (not illustrated in the drawings) used for forming the sipe can be relatively easily manufactured with, for example, a precision casting method using, for example, a collapsible casting mold made of materials such plaster, an electroforming method (a method of manufacturing metal products by electroplating), a diffusion bonding method (a method of adhering base materials closely, applying pressure to the base materials to the extent where plastic deformation can be suppressed as much as possible under temperature conditions not exceeding the melting point of the base materials, and joining the base materials using the diffusion of atoms generated between joining surfaces), or a laminating shaping method.

Embodiment 2-2

Figure 13:
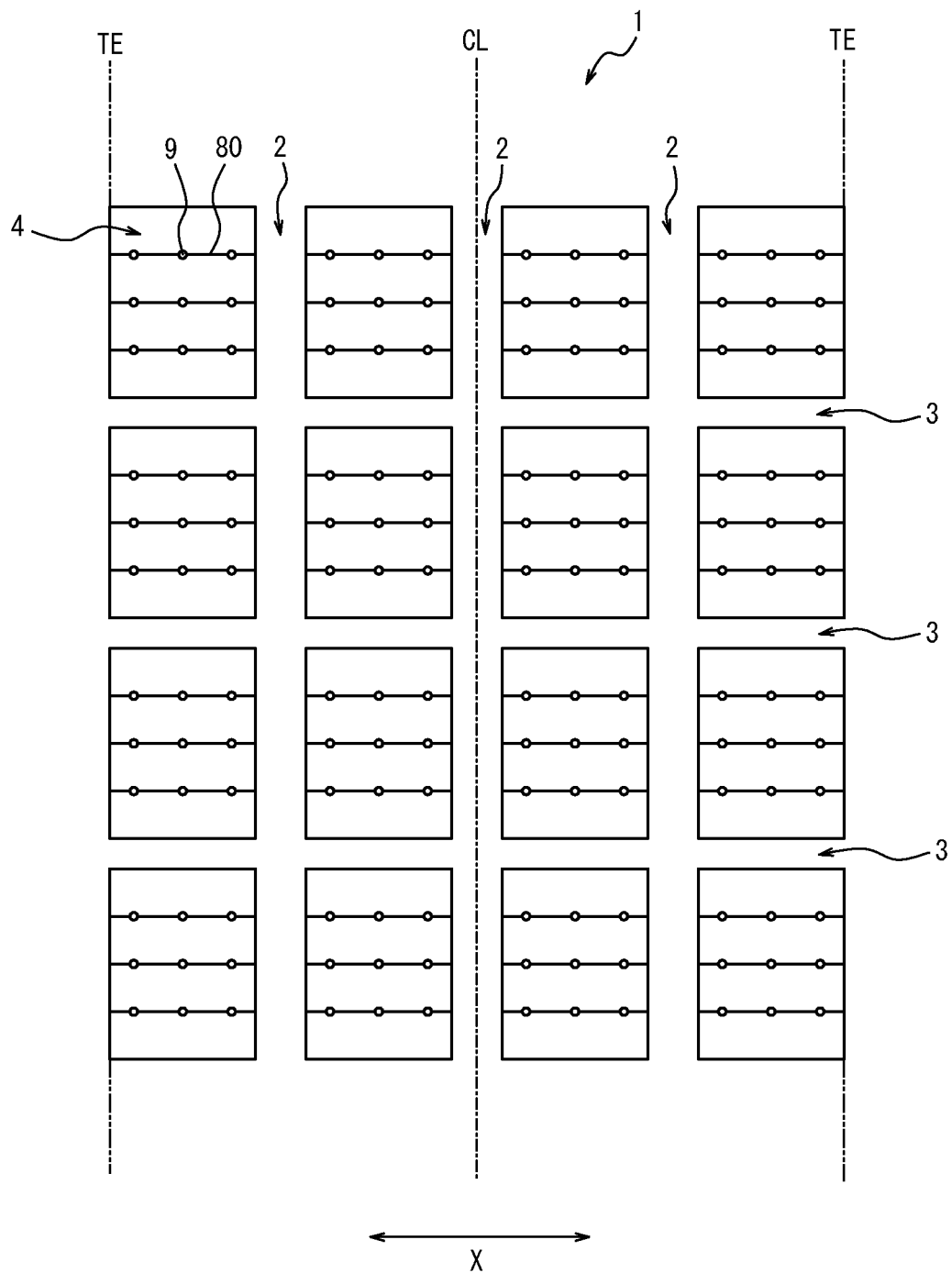
FIG. 13 is a developed view illustrating a tread surface of a tire of Embodiment 2-2 of the present disclosure.

Next, a tire of Embodiment 2-2 of the present disclosure will be described with reference to FIG. 13. In FIG. 13, components similar to those in FIG. 10 are given the same reference signs as in FIG. 10 and the description thereof is omitted.

In the sipe 80 of the present embodiment, a portion that expands in a direction intersecting the extending direction X of the sipe 80 may include a depth direction widened portion 9 extending continuously from the tread surface 1 toward the depth direction of the sipe, as illustrated in FIG. 13. That is, at least one, in the illustrated example, three depth direction widened portions 9 may be provided along an opening S of the sipe 80.

In other words, in the sipe 80 of the present embodiment, a portion that expands in a direction intersecting the extending direction X of the sipe 80 may include a depth direction widened portion 9 that extends continuously toward the depth direction of the sipe 80 and intersects with a widened portion continuous in the sipe extending direction (hereinafter, referred to as "sipe extending direction widened portion"), such as the above-described widened portion W1, in the depth direction of the sipe 80. According to this structure, when the sipe 80 formed in the block land portion 4 comes into contact with a road surface, the depth direction widened portion 9 continuous in the sipe depth direction takes a sufficient amount of water into the sipe 80, and the water flows into the sipe extending direction widened portion and is drained from the groove and the tread edge via the sipe extending direction widened portion. In this way, higher drainage performance can be realized.

Embodiment 2-3

FIG. 14 is a cross-sectional perspective view of an example of the shape of a sipe of a land portion of a tire of Embodiment 2-3 of the present disclosure.

First, as the opening shape of the sipe 800 on the tread surface illustrated in FIG. 14, the sipe 800 includes straight line-shaped portions 800a and 800b that extend linearly at the two ends of the sipe 800 extending across the block land portion 400 respectively, and a broken line-shaped portion 800c extending between the two straight line-shaped portions 800a and 800b and passing through a plurality of bent portions.

The straight line-shaped portions 800a and 800b are straight portions extending in the sipe depth direction along the opening shape. For the broken line-shaped portion 800c sandwiched between the straight line-shaped portions, each side portion of the broken line (zigzag), which is the opening shape, is formed by combining displacement surfaces, where each displacement surface is displaced in a broken-line shape (a zigzag shape) and extends in the sipe depth direction.

In addition, in the present embodiment, it is preferable that the sipe 800 include widened portions W100, W200, W300 and W400 continuous along the extending direction of the sipe 800, and the widened portions W100 to W400 be arranged at positions where bent portions are formed in the depth direction of the sipe 800. According to this structure, the effect of supporting the side walls that define the sipe 800 is most unlikely to decrease, and the drainage performance can be improved while suppressing a decrease in rigidity of the block land portion 4. In the illustrated example, the widened portions W100, W200, W300 and W400 are arranged along the broken line-shaped portion 800c on the tread surface. However, these widened portions can also be arranged along the straight line-shaped portions 800a and 800b.

At least one of the widened portions W100, W200, W300 and W400 is in a similar manner with the widened portion W1 of the sipe 8 illustrated in FIG. 12A, having a straight line portion F100 (not illustrated in the drawing), in which an angle formed with a line segment O orthogonal to the normal line N at the opening center of the sipe on the tread surface is 30° or more, in a wall surface on the major angle side of the bent portion of the wall surfaces that define the widened portion.

In other words, according to this structure, when the tire comes into contact with a road surface and water flows in from the opening S, the water can be efficiently taken into the widened portion. In addition, when a large amount of water flows into the sipe, the water can be taken in along the depth direction of the sipe without stagnation. Further, even in the case of draining water while rolling the tire, the drainage of water can be accelerated by providing a straight line portion that is inclined with respect to a surface orthogonal to the tread surface.

Furthermore, it is possible to suppress a decrease in rigidity of the block land portion 4 as compared with the case of a surface curved with respect to the tread surface.

In the present embodiment, a depth direction widened portion 900 may also be provided. From the viewpoint of suppressing a decrease in rigidity of the block land portion 4, the depth direction widened portion 900 preferably extends in the sipe depth direction from the middle of each side of the broken line of the sipe 800 on the tread surface.

REFERENCE SIGNS LIST

1 tread surface
2 circumferential groove
3 widthwise groove
4 block land portion
5, 50 and 500 sipe
6, 60 and 600 first widened portion
7, 70 and 700 second widened portion
M1 to M3 bending point
8, 80 and 800 sipe
8a and 8f straight portion
8b, 8c, 8d and 8e inclined portion
800a and 800b straight line-shaped portion
800c broken line-shaped portion
9 and 900 depth direction widened portion
a1, a3 and a4 wall surface on the major angle side
a2 wall surface on the minor angle side
Q1 to Q5 bent portion
W1 to W3 widened portion
W100, W200, W300 and W400 widened portion
F1 to F6, and F100 straight line portion N normal line
S opening
s1 opening center
O line segment
CL equator
TE tread edge

The invention claimed is:

1. A tire in which at least one land portion is defined on a tread surface of the tire between grooves or between a groove and a tread edge, wherein
   the at least one land portion comprises at least one sipe extending linearly, and
   in a cross section orthogonal to an extending direction of the sipe,
   the sipe comprises at least one bent portion,
   the at least one bent portion has a widened portion which has an increased width relative to sipe portions sandwiching the bent portion,
   the widened portion has a straight line portion, in which an angle formed with a line segment orthogonal to a normal line at an opening center of the sipe on the tread surface is 30° or more, in a wall surface on a major angle side of the bent portion of wall surfaces that define the widened portion,
   one of the sipe portions is an inclined portion located at a tread surface side relative to the widened portion and inclined with respect to the normal line,
   the straight line portion is linearly continuous with a side wall of the inclined portion, and
   the widened portion having the straight line portion is provided in the bent portion sandwiched between the sipe portions that are inclined respectively to one side and to the other side with respect to the normal line.

2. The tire according to claim 1, wherein the sipe extends across the land portion comprising the sipe.

3. The tire according to claim 1, wherein a maximum diameter of the widened portion is 200% or more and 450% or less of a maximum width of the sipe portions.

4. The tire according to claim 1, wherein the sipe comprises a depth direction widened portion in which a portion expanding in a direction intersecting the extending direction of the sipe extends continuously from the tread surface toward a depth direction of the sipe.

* * * * *